(12) United States Patent
Roberts

(10) Patent No.: US 8,948,733 B2
(45) Date of Patent: Feb. 3, 2015

(54) CONSUMER REGISTRATION VIA MOBILE DEVICE

(71) Applicant: ShopText, Inc., New York, NY (US)

(72) Inventor: Steven C. Roberts, Wilton, CT (US)

(73) Assignee: ShopText, Inc., New York, NY (US)

( * ) Notice: Subject to any disclaimer, the term of this patent is extended or adjusted under 35 U.S.C. 154(b) by 0 days.

(21) Appl. No.: 13/933,497

(22) Filed: Jul. 2, 2013

(65) Prior Publication Data

US 2013/0295893 A1  Nov. 7, 2013

Related U.S. Application Data

(63) Continuation of application No. 11/755,419, filed on May 30, 2007, now abandoned.

(51) Int. Cl.
| | |
|---|---|
| *H04W 4/14* | (2009.01) |
| *H04W 4/00* | (2009.01) |
| *G06Q 20/32* | (2012.01) |
| *G06Q 20/40* | (2012.01) |
| *H04L 29/12* | (2006.01) |

(52) U.S. Cl.
CPC ............. *H04W 4/14* (2013.01); *G06Q 20/32* (2013.01); *G06Q 20/322* (2013.01); *G06Q 20/40* (2013.01); *G06Q 20/4014* (2013.01); *H04L 29/12047* (2013.01); *H04L 61/15* (2013.01)
USPC ...................................................... 455/414.1

(58) Field of Classification Search
CPC ........... H04W 8/04; H04W 4/20; H04W 4/00; H04W 4/22; H04W 92/045
USPC ........ 455/403, 404.1, 404.2, 414.1, 415, 419, 455/426.1, 435.1
See application file for complete search history.

(56) References Cited

U.S. PATENT DOCUMENTS

| | | | |
|---|---|---|---|
| 5,794,210 | A | 8/1998 | Goldhaber et al. |
| 5,850,599 | A | 12/1998 | Seiderman |
| 5,937,391 | A | 8/1999 | Ikeda et al. |
| 6,134,548 | A | 10/2000 | Gottsman et al. |
| 6,144,848 | A | 11/2000 | Walsh et al. |
| 6,148,331 | A | 11/2000 | Parry |
| 6,314,406 | B1 | 11/2001 | O'Hagan et al. |
| 6,490,567 | B1 | 12/2002 | Gregory |
| 6,512,919 | B2 | 1/2003 | Ogasawara |
| 6,516,056 | B1 | 2/2003 | Justice et al. |

(Continued)

FOREIGN PATENT DOCUMENTS

WO    WO 02/25603    3/2002

OTHER PUBLICATIONS

Web Page: http://www.ipsh.com/site.nsf/~/index.shtml printed on Jun. 28, 2005.

(Continued)

*Primary Examiner* — Myron K Wyche
(74) *Attorney, Agent, or Firm* — Finnegan, Henderson, Farabow, Garrett & Dunner LLP

(57) ABSTRACT

Exemplary embodiments provide systems and methods to receive a transmission that is associated with an identification number and includes a number associated with a land line, determine a physical address based on the number associated with the land line, confirm the physical address that was determined, and associate the physical address with a user account, the user account being identified by the identification number.

21 Claims, 9 Drawing Sheets

(56) References Cited

U.S. PATENT DOCUMENTS

| | | |
|---|---|---|
| 6,611,811 B1 | 8/2003 | Deaton et al. |
| 6,663,002 B2 | 12/2003 | Glaser |
| 6,799,165 B1 | 9/2004 | Boesjes |
| 6,807,410 B1 | 10/2004 | Pailles et al. |
| 6,873,968 B2 | 3/2005 | Ehrlich et al. |
| 6,889,325 B1 | 5/2005 | Sipman et al. |
| 6,912,503 B1 | 6/2005 | Quarendon et al. |
| 6,934,529 B2 | 8/2005 | Bagoren et al. |
| 6,957,041 B2 | 10/2005 | Christensen et al. |
| 7,103,565 B1 | 9/2006 | Vaid |
| 7,110,792 B2 | 9/2006 | Rosenberg |
| 8,140,398 B1 | 3/2012 | Boesjes |
| 2001/0037264 A1 | 11/2001 | Husemann et al. |
| 2001/0037266 A1 | 11/2001 | Schroeder |
| 2001/0049277 A1 | 12/2001 | Meyer et al. |
| 2001/0049636 A1 | 12/2001 | Hudda et al. |
| 2002/0002504 A1 | 1/2002 | Engel et al. |
| 2002/0016750 A1 | 2/2002 | Attia |
| 2002/0029342 A1 | 3/2002 | Keech |
| 2002/0082931 A1 | 6/2002 | Siegel et al. |
| 2002/0104090 A1 | 8/2002 | Stettner |
| 2002/0107755 A1 | 8/2002 | Steed et al. |
| 2002/0111869 A1 | 8/2002 | Shuster et al. |
| 2002/0116264 A1 | 8/2002 | Feidelson et al. |
| 2002/0119767 A1 | 8/2002 | Fieldhouse et al. |
| 2002/0123940 A1 | 9/2002 | Spets |
| 2002/0152179 A1 | 10/2002 | Racov |
| 2002/0161658 A1 | 10/2002 | Sussman |
| 2002/0194604 A1 | 12/2002 | Sanchez et al. |
| 2003/0004891 A1 | 1/2003 | Van Rensburg et al. |
| 2003/0014327 A1 | 1/2003 | Skantze |
| 2003/0050896 A1 | 3/2003 | Wiederin |
| 2003/0119485 A1 | 6/2003 | Ogasawara |
| 2003/0135417 A1 | 7/2003 | Bodin |
| 2004/0030601 A1 | 2/2004 | Pond et al. |
| 2004/0034561 A1 | 2/2004 | Smith |
| 2004/0083166 A1 | 4/2004 | Pailles |
| 2004/0087339 A1 | 5/2004 | Goldthwaite et al. |
| 2004/0107170 A1 | 6/2004 | Labrou et al. |
| 2004/0117302 A1 | 6/2004 | Weichert et al. |
| 2004/0139013 A1 | 7/2004 | Barbier et al. |
| 2004/0147245 A1 | 7/2004 | Kastelewicz et al. |
| 2004/0158492 A1 | 8/2004 | Lopez et al. |
| 2004/0204063 A1* | 10/2004 | Van Erlach ............... 455/556.1 |
| 2004/0215526 A1 | 10/2004 | Luo et al. |
| 2004/0235450 A1 | 11/2004 | Rosenberg |
| 2004/0243478 A1 | 12/2004 | Walker et al. |
| 2004/0249712 A1 | 12/2004 | Brown et al. |
| 2005/0004840 A1 | 1/2005 | Wanninger |
| 2005/0033684 A1 | 2/2005 | Benedyk et al. |
| 2005/0064849 A1 | 3/2005 | Coppinger et al. |
| 2005/0071230 A1 | 3/2005 | Mankoff |
| 2005/0075932 A1 | 4/2005 | Mankoff |
| 2005/0080634 A1 | 4/2005 | Kanniainen et al. |
| 2005/0080683 A1 | 4/2005 | Jordan |
| 2005/0086128 A1 | 4/2005 | Shanahan |
| 2005/0105701 A1 | 5/2005 | Tucciarone et al. |
| 2005/0136899 A1 | 6/2005 | Pines et al. |
| 2005/0165503 A1 | 7/2005 | Ono |
| 2005/0233735 A1 | 10/2005 | Karaoguz et al. |
| 2005/0239495 A1 | 10/2005 | Bayne |
| 2006/0015402 A1 | 1/2006 | Graves et al. |
| 2006/0047568 A1 | 3/2006 | Eisenberg et al. |
| 2006/0200385 A1 | 9/2006 | Bray, III |
| 2006/0206709 A1* | 9/2006 | Labrou et al. .............. 713/167 |
| 2006/0213968 A1 | 9/2006 | Guest et al. |
| 2006/0240824 A1 | 10/2006 | Henderson et al. |
| 2006/0258397 A1 | 11/2006 | Kaplan et al. |
| 2006/0259361 A1 | 11/2006 | Barhydt et al. |
| 2006/0265284 A1 | 11/2006 | Moodie et al. |
| 2007/0105548 A1 | 5/2007 | Mohan et al. |
| 2007/0107044 A1 | 5/2007 | Yuen et al. |
| 2007/0123219 A1* | 5/2007 | Lovell ..................... 455/412.1 |
| 2007/0156517 A1 | 7/2007 | Kaplan |
| 2007/0200879 A1 | 8/2007 | Lapstun et al. |
| 2007/0218900 A1* | 9/2007 | Abhyanker .............. 455/435.1 |
| 2007/0255662 A1 | 11/2007 | Tumminaro |
| 2007/0275738 A1* | 11/2007 | Hewes et al. ............... 455/466 |
| 2007/0287430 A1 | 12/2007 | Hosain et al. |
| 2008/0287148 A1* | 11/2008 | Silver et al. ................ 455/466 |
| 2009/0015379 A1 | 1/2009 | Rosenberg |

OTHER PUBLICATIONS

U.S. Appl. No. 60/657,549 of William Weston Bray, III for Electronic Marketing System and Method, Patent 04306-P0001A GSW/SBS.

International Search Report and the Written Opinion of The International Searching Authority for PCT/US08/64675 mailed Jul. 23, 2008, 10 pages.

International Search Report for PCT/US2007/018292 mailed Feb. 21, 2008, 2 pages.

* cited by examiner

CONSUMER REGISTRATION VIA MOBILE DEVICE

This is a continuation of application Ser. No. 11/755,419, filed May 30, 2007, which is incorporated herein by reference.

FIELD OF THE DISCLOSURE

Exemplary embodiments of the disclosure are related generally to consumer registration via a mobile device.

BACKGROUND OF THE DISCLOSURE

Consumer registration via a mobile device may be tedious and time consuming given the complexities associated with providing address and/or payment information via text messaging, for example. If a user is forced into a complex interaction with a mobile device to register, the consumer may opt not to register. Similarly, if a consumer is required to register via an alternative platform, the consumer may opt not to register.

These and other drawbacks exist.

SUMMARY

Various exemplary embodiments of the disclosure provide a system including a communication module to receive a transmission associated with an identification number and including a number associated with a land line, an address determination module to determine a physical address based on the number associated with the land line, a confirmation module to confirm the physical address that was determined, and a user account module to associate the physical address with a user account, the user account being identified by the identification number.

Various exemplary embodiments of the disclosure also provide a method including receiving a transmission associated with an identification number and including a number associated with a land line, determining a physical address based on the number associated with the land line, confirming the physical address that was determined, and associating the physical address with a user account, the user account being identified by the identification number.

Various exemplary embodiments also provide a computer-accessible medium encoded with computer program code effective to receive a transmission associated with an identification number and including a number associated with a land line, determine a physical address based on the number associated with the land line, confirm the determination of the physical address, and associate the physical address with a user account, the user account being identified by the identification number.

DETAILED DESCRIPTION

Exemplary embodiments are discussed in detail below. While specific exemplary embodiments are discussed, it should be understood that this is done for illustration purposes only. A person skilled in the relevant art will recognize that other of the claimed inventions.

Exemplary embodiments provide systems and methods for consumer registration via, for example, a mobile device. For example, a mobile phone user may register to engage in a promotion or make a purchase using his or her mobile phone. The user may first initiate contact with an integrated mobile application server by transmitting a request to the integrated mobile application server to engage in the promotion or make a purchase. Using the user's mobile phone number as an identifier, the integrated mobile application server may determine whether the user has an existing account. Upon a determination that the user does not have an existing account, the integrated mobile application server may initiate the registration process.

To register the user, the integrated mobile application server may request that the user provide a phone number associated with a land line. The integrated mobile application server may use this land line number to query a database to obtain a physical address associated with the land line number. Upon obtaining the physical address, the integrated mobile application server may confirm with the user that the address is accurate. Once confirmed, the user may be registered and the integrated mobile application server may create a user account.

Registering via a mobile device in this manner may enable the user to register and engage in the promotion and/or purchase consumer products within a single interactive session. To register, a user may communicate registration information, including without limitation, a physical address and billing information to an integrated mobile application server to create a user account associated with the user and the integrated mobile application server.

Figure 1:
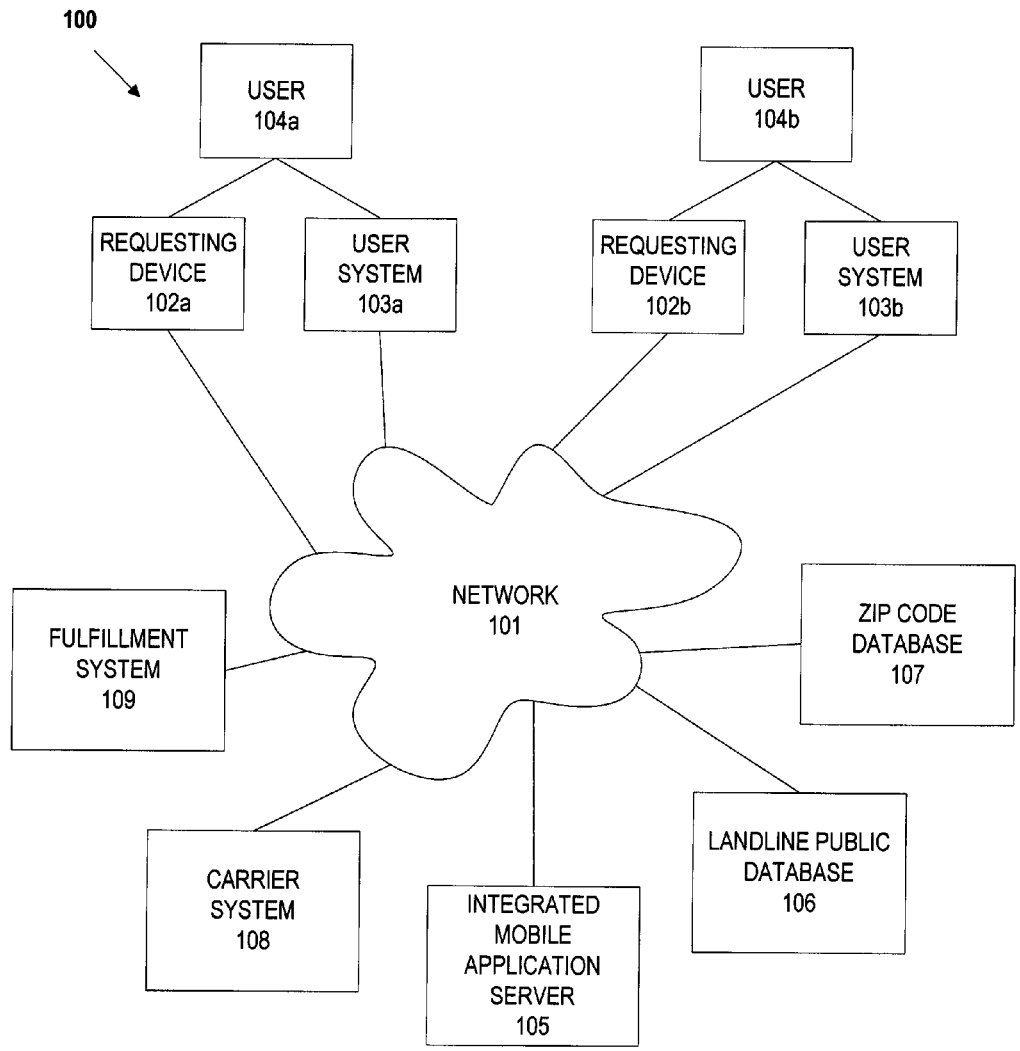
FIG. 1 depicts an exemplary consumer registration system according to an embodiment of the disclosure.

FIG. 1 depicts an exemplary system 100 for consumer registration according to an embodiment of the disclosure. System 100 may include a network 101, one or more users 104a-104b associated with respective requesting devices 102a-102b and user systems 103a-103b, an integrated mobile application server 105, a land line public database 106, a zip code database 107, a carrier system 108, and a fulfillment system 109. As shown in FIG. 1, requesting devices 102a-102b user systems 103a-103b, integrated mobile application server 105, land line public database 106, zip code database 107, carrier system 108, and fulfillment system 109 may be coupled via network 101. The components of system 100 may be part of a single system, or the components may be physically and/or logically separated.

Network 101 may include an analog telephone network, a digital telephone network, a cellular telephone network (e.g., a code-division multiple access ("CDMA") network, a time division multiple access ("TDMA") network, a global system for mobile communication ("GSM") network, a digital cellular or personal communication service ("PCS") network, and/or an enhanced data GSM environment (EDGE) network), a public wide area network ("WAN"), such as the Internet, or, different connections, such as combinations of public and private WANs, local areas networks ("LANs"), wireless LANs, encrypted networks, body area networks, or other wired or wireless networks. Network 101 may be a packet-switched network and receive and transmit data via packets. Network 101 may enable communication via the Internet. Network 101 may also enable communication via short message service ("SMS"), enhanced messaging service ("EMS"), multimedia messaging service ("MMS"), electronic mail, instant messaging, and/or Wireless Application Protocol ("WAP"). In exemplary embodiments of the disclosure, network 101 may include one, or any number of the exemplary types of networks mentioned above operating as a stand-alone network or in cooperation with each other. Use of the term network herein is not intended to limit the network to a single network.

Requesting devices 102a-102b may be any device capable of communicating with, for example, integrated mobile application server 105, via network 101. For example, requesting devices 102a-102b may include, but are not limited to: e.g., any computer device, or communications device including, e.g., a personal computer (PC), a workstation, a mobile device, a phone (e.g., a cellular phone), a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In various embodiments, requesting devices 102a-102b may also include an interface to display information received from, for example, integrated mobile application server 105 and/or carrier system 108 over network 101.

In various exemplary embodiments, requesting devices 102a-102b may be a wireless device, such as a mobile phone or like device, that may be capable of communicating via the Internet, short message service ("SMS"), enhanced messaging service ("EMS"), multimedia messaging service ("MMS"), electronic mail, instant messaging, and/or Wireless Application Protocol ("WAP"). Where requesting devices 102a-102b are mobile phones, requesting devices 102a-102b, may be capable of initiating and receiving telephone calls and transmitting and receiving text messages.

User systems 103a-103b may also be any device capable of communicating with, for example, integrated mobile application server 105, via network 101. For example, user systems 103a-103b may include, but are not limited to: e.g., any computer device, or communications device including, e.g., a personal computer (PC), a workstation, a mobile device, a phone (e.g., a cellular phone), a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In various embodiments, user systems 103a-103b may also include an interface to display information received from, for example, integrated mobile application server 105 land line public database 106, zip code database 107, and/or fulfillment system 109 over network 101.

In various exemplary embodiments, user systems 103a-103b may be computer systems that may be capable of communicating via the Internet. User systems 103a-103b may include a web browser client installed on user system 103a-103b, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively.

Users 104a-104b may interact with respective requesting devices 102a-102b and/or respective user systems 103a-103b to communicate with integrated mobile application server 105. Users 104a-104b may, for example, interact with their respective requesting devices 102a-102b to transmit text messages via network 101 to integrated mobile application server 105 to engage in a promotion and/or purchase consumer products. For example, user 104a may interact with requesting device 102a to transmit a text message including the phrase "promo" to a number associated with a common short code ("CSC") that may be associated with integrated mobile application server 105. Similarly, user 104b may interact with requesting device 102b to transmit a text message including the phrase "buy" to a number associated with a common short code ("CSC") that may be associated with integrated mobile application server 105. As will be understood by those having ordinary skill in the art, a CSC may represent a special telephone number that may be used to address SMS and/or MMS messages from mobile phones. Users 104a-104b may also interact with respective requesting devices 102a-102b to receive text messages from integrated mobile application server 105. Users 104a-104b may also interact with respective requesting devices 102a-102b to interact with an interactive voice recognition ("IVR") system that may be associated with integrated mobile application server 105.

Users 104a-104b may, for example, interact with respective user systems 103a-103b to access user account information associated with integrated mobile application server 105. For example, using an Internet-enabled computer, users 104a-104b may log into integrated mobile application server 105 to access and/or edit user account details such as, address information, payment information, gift recipient information, order history, and/or any other account information as will be described in greater detail below.

In various exemplary embodiments, integrated mobile application server 105 may be coupled to network 101 and may enable consumer registration via a mobile device as will be described in greater detail below. Integrated mobile application server 105 may include an integrated mobile application server as shown and described in U.S. patent application Ser. No. 11/125,833, filed on Mar. 17, 2005, the content of which is incorporated herein by reference. As illustrated in FIG. 1, integrated mobile application server 105 may be coupled to network 101 to communicate with users 104a-104b via respective requesting devices 102a-102b and/or user systems 103a-103b, land line public database 106, zip code database 107, carrier system 108, and fulfillment system 109.

Land line public database 106 may include any data storage device or devices that may store physical address information and associated land line phone numbers. For example, land line public database may store an address 123 Any Street, Anytown, AnyState associated with land line number (111) 222-333. Land line public database 106 may include software, hardware, and/or firmware that may receive a transmission including a land line number (e.g., (111) 222-3333) requesting the associated physical address and return the physical address associated with the land line number to the requestor, sender of the transmission, and/or entity accessing land line public database 106. In various exemplary embodiments, land line public database 106 may be physically separated from integrated mobile application server 105 as illustrated in FIG. 1. Also, land line public database 106 may be integrated logically separated, but integral with integrated mobile application server 105.

Zip code database 107 may include any data storage device or devices that may store zip codes (e.g., postal codes) and associated city and state information. For example, zip code database 107 may store a zip code (e.g., 22222) associated with city Anytown and state AnyState. Zip code database 107 may include software, hardware, and/or firmware that may receive a request including a zip code (e.g., 22222) and return the associated city and state information.

Carrier system 108 may include any system associated with a mobile service carrier. For example, carrier system 108 may include systems associated with mobile service carriers including, without limitation, Verizon Wireless, Nextel Communications, AT&T Wireless, Cingular Wireless, T-Mobile Communications and/or the like. Carrier system 108 may store a user's carrier account information. For example, carrier system 108 may include one or more data storage devices that may store a user's mobile phone number and associated account information. The associated carrier account information may include, without limitation, the user's billing address. In various exemplary embodiments, with permission from the user, integrated mobile application server 105 may access a user's mobile phone account to obtain the user's billing address information. Accordingly, carrier system 108 may include software, hardware, and/or firmware that may receive a request associated with a user's mobile phone number and return the user's billing address information.

Fulfillment system 109 may include any system associated with filling orders for consumer products, for example. To fill orders for consumer products, fulfillment system 109 may include software, hardware, and/or firmware that may enable fulfillment system to receive user, consumer product, and/or address information and fulfill the order. For example, via network 101, a fulfillment system may receive a user's name, the user's address (e.g., 123 Any Street, Anytown, AnyState 22222), and consumer product information (e.g., a Stock Keeping Unit (SKU) and a quantity) to fulfill an order.

Figure 2:
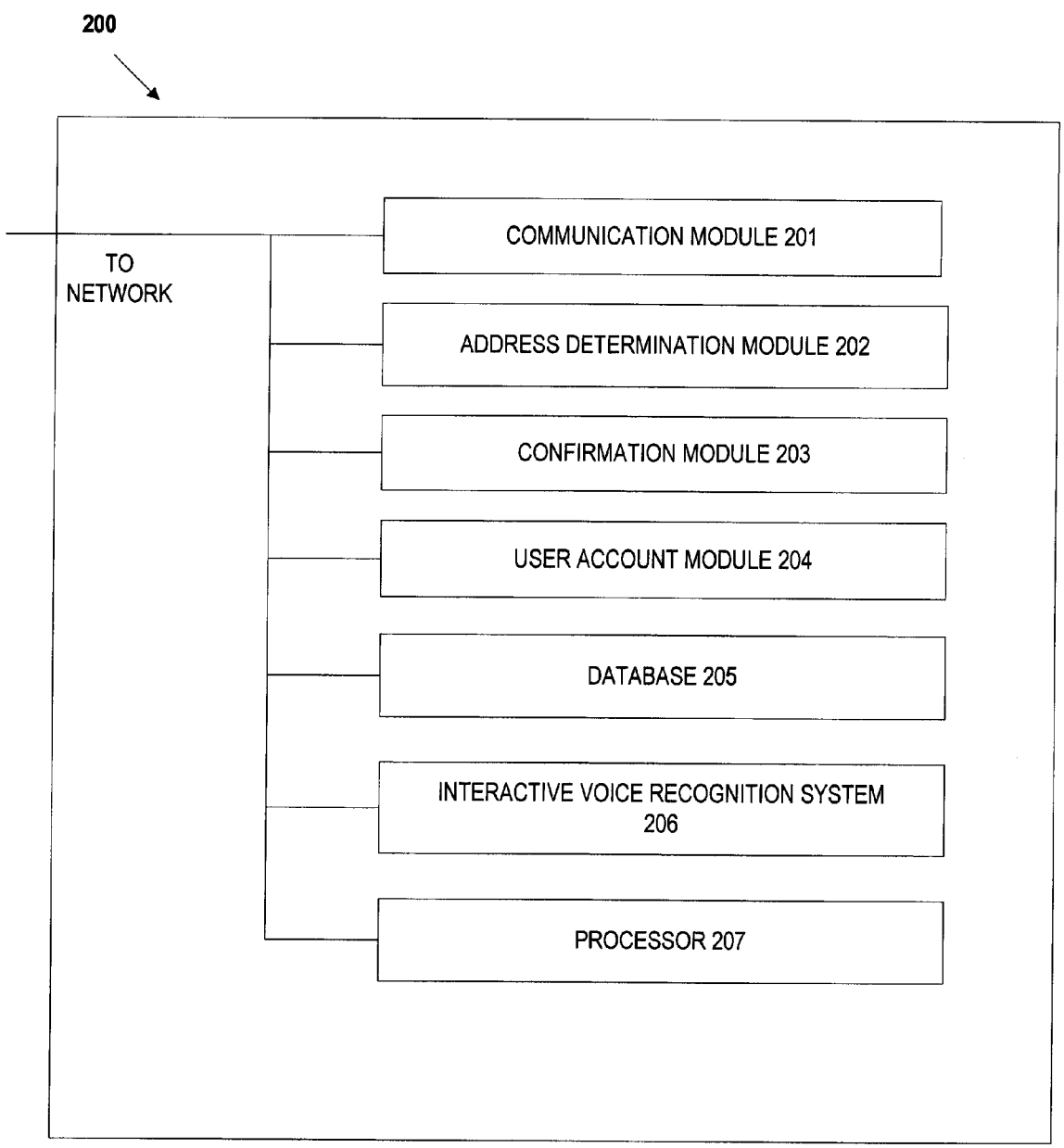
FIG. 2 depicts an exemplary integrated mobile application server according to an embodiment of the disclosure.

FIG. 2 depicts an exemplary integrated mobile application server 200 according to an embodiment of the disclosure. Integrated mobile application server 200 may integrate one or more requesting devices and/or user systems with a fulfillment system to enable users to engage in a promotion and/or purchase consumer goods. Integrated mobile application server 200 may provide an application server framework that may support multiple telecommunication channels.

As shown in FIG. 2, integrated mobile application server 200 may include one or more of the following modules: a communication module 201, an address determination module 202, a confirmation module 203, a user account module 204, a database 205, an interactive voice recognition ("IVR") system 206, and a processor 207. In various exemplary embodiments, each module of integrated mobile application server 200 may interact and cooperate with the other modules to enable the integration of requesting devices with fulfillment systems, for example. The various modules of integrated mobile application server 200 may be part of a single system, or may be part of a plurality of systems that may be physically and/or logically separated.

Communication module 201 may include hardware, software, and/or firmware to enable communication between and among the modules of integrated mobile application server 200 and between of integrated mobile application server 200 other elements of a network. For example, communication module 201 may allow communication between user account module 204 and database 205, and/or between communication module 201 and interactive voice recognition system 205 and/or between confirmation module 203 and address determination module 202.

Also, communication module may allow communication between of integrated mobile application server 200 and elements of a network including, without limitation, requesting devices, user systems, land line public databases, zip code databases, carrier systems, and fulfillment systems. Communication module 201 may communicate with network elements via any number of protocols. Communication module 201 may also enable integrated mobile application server 200 to make requests to network elements. For example, communication module 201 may enable of integrated mobile application server 200 to request a land line number and/or zip code from a requesting device. Communication module 201 may also enable integrated mobile application server 200 to query external databases that may be associated with, for example, land line public databases, zip code databases, and/or carrier systems. Communication module 201 may enable integrated mobile application server 200 to receive responses from requesting devices and/or other network elements (e.g., user systems and/or databases).

Address determination module 202 may include hardware, software, and/or firmware to enable integrated mobile application server 200 to determine a physical address associated with a land line number, for example. Address determination module 202 may also enable integrated mobile application server 200 to determine city and state information associated with a zip code. Address determination module 202 may also enable integrated mobile application server 200 to compile a physical address based on a zip code, city and state information, and a street address.

Confirmation module 203 may include hardware, software, and/or firmware to enable integrated mobile application server 200 to transmit and receive confirmations to and from requesting devices. For example, confirmation module 203 may enable integrated mobile application server 200 to transmit an address or PIN confirmation to a requesting device. Confirmation module 203 may also enable integrated mobile application server 200 to receive confirmation responses from requesting devices, for example.

Figure 6:
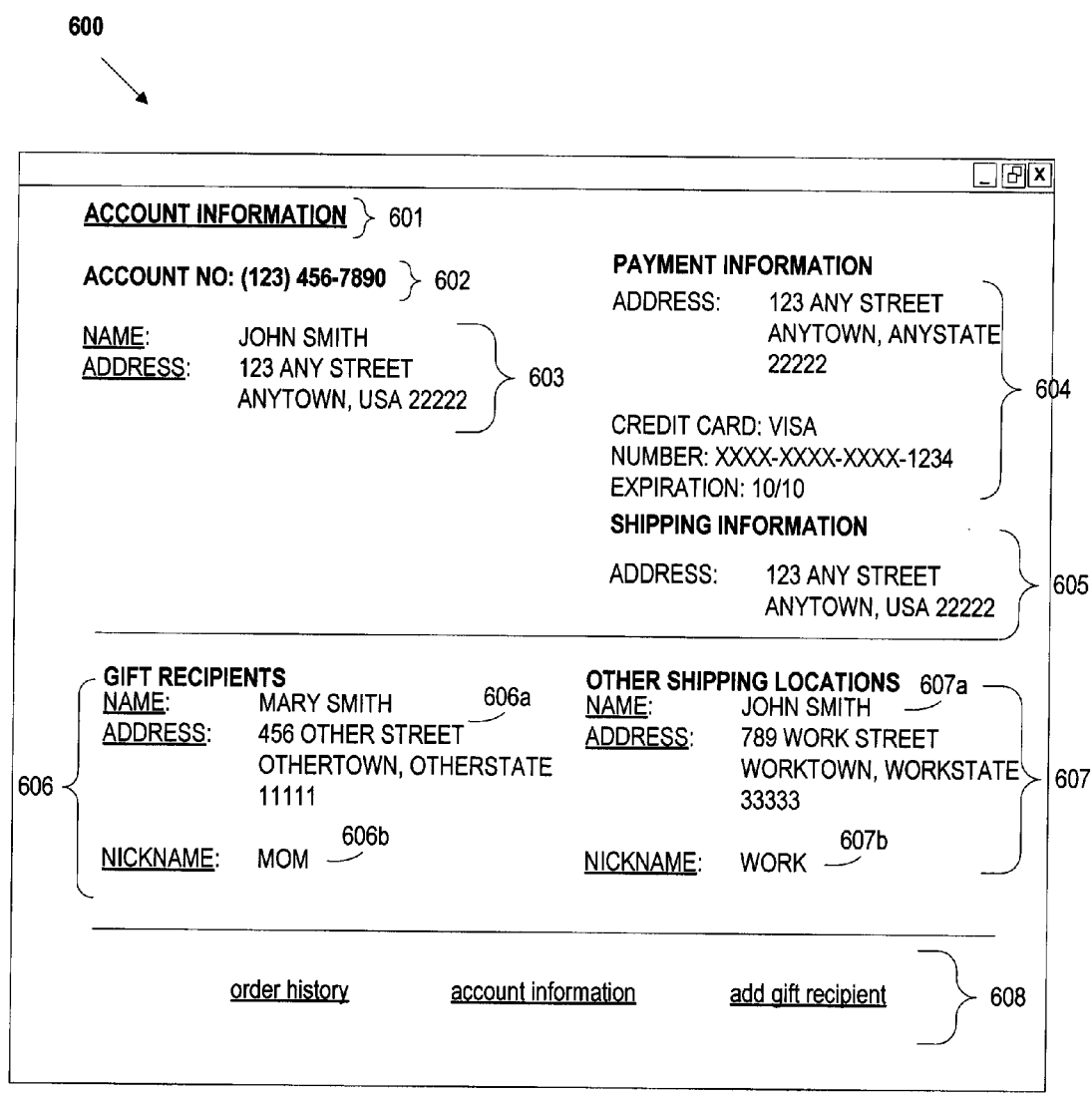
FIG. 6 depicts an exemplary screen display illustrating exemplary user account information according to an embodiment of the disclosure.

User account module 204 may include hardware, software, and/or firmware to enable integrated mobile application server 200 to create, update, and/or maintain user account information (See, FIG. 6, for example). User account module 204 may interact with database 205 to store user account information associated with integrated mobile application server 200. User account module 204 may also determine user account information based on an identification number. For example, given a mobile phone number, user account module 204 may retrieve associated user account information from database 205. Also, user account module 204 may cooperate and/or interact with address determination module to store addresses associated with user accounts.

Database 205 may include one or more data storage devices associated with integrated mobile application server 200. Database 205 may store user account information, consumer product information (e.g., unique identifiers and associated consumer product information), land line number information, zip code information, carrier system information, and/or any other information that may be used by integrated mobile application server 200.

Integrated voice recognition system 206 may include hardware, software, and/or firmware that may provide interactive voice response via telephone systems. For example, IVR 206 may enable customers to interact with integrated mobile application server 200 to provide information to integrated mobile application server 200. For example, IVR 206 may call a requesting device to initiate an interactive voice response session during which a customer inputs land line number information, zip code information, payment information, and/or the like. IVR 206 may cooperate with database 205 to store information received via IVR 206.

Processor 207 may include hardware, software, and/or firmware to enable the operation of integrated mobile application server 200. For example, processor 207 may include hardware, software, and/or firmware to enable the execution of instructions to perform the operations of integrated mobile application server 200.

Figure 3A:
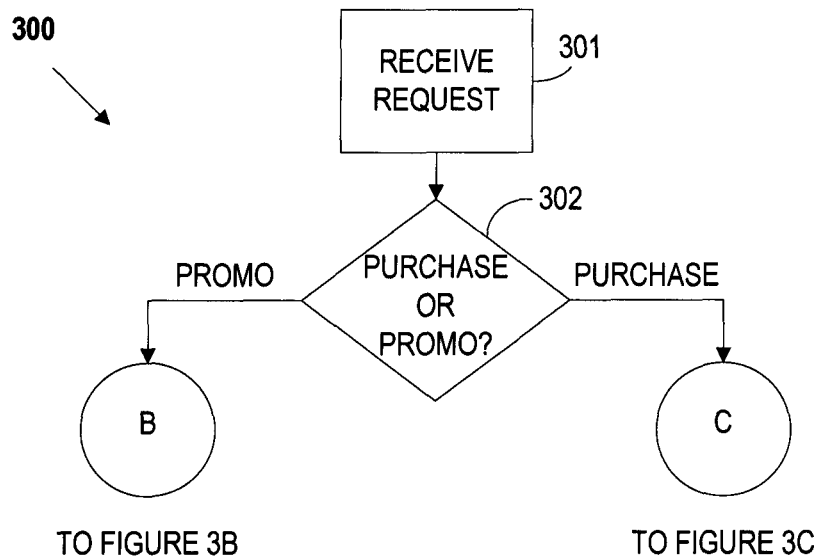
FIG. 3A depicts an exemplary method of consumer registration according to an embodiment of the disclosure.
Figure 3B:
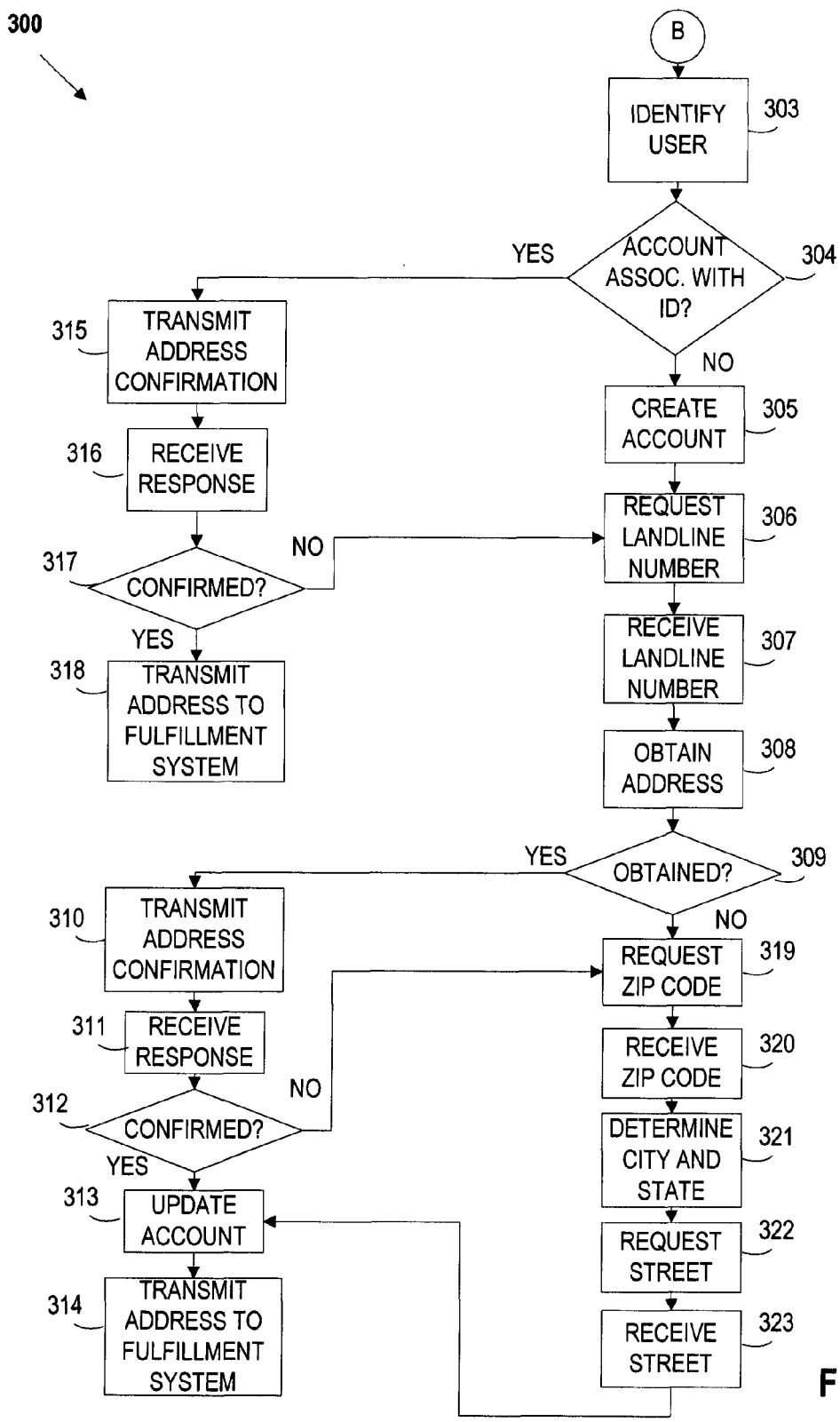
FIG. 3B depicts an exemplary method of consumer registration according to an embodiment of the disclosure.
Figure 3C:
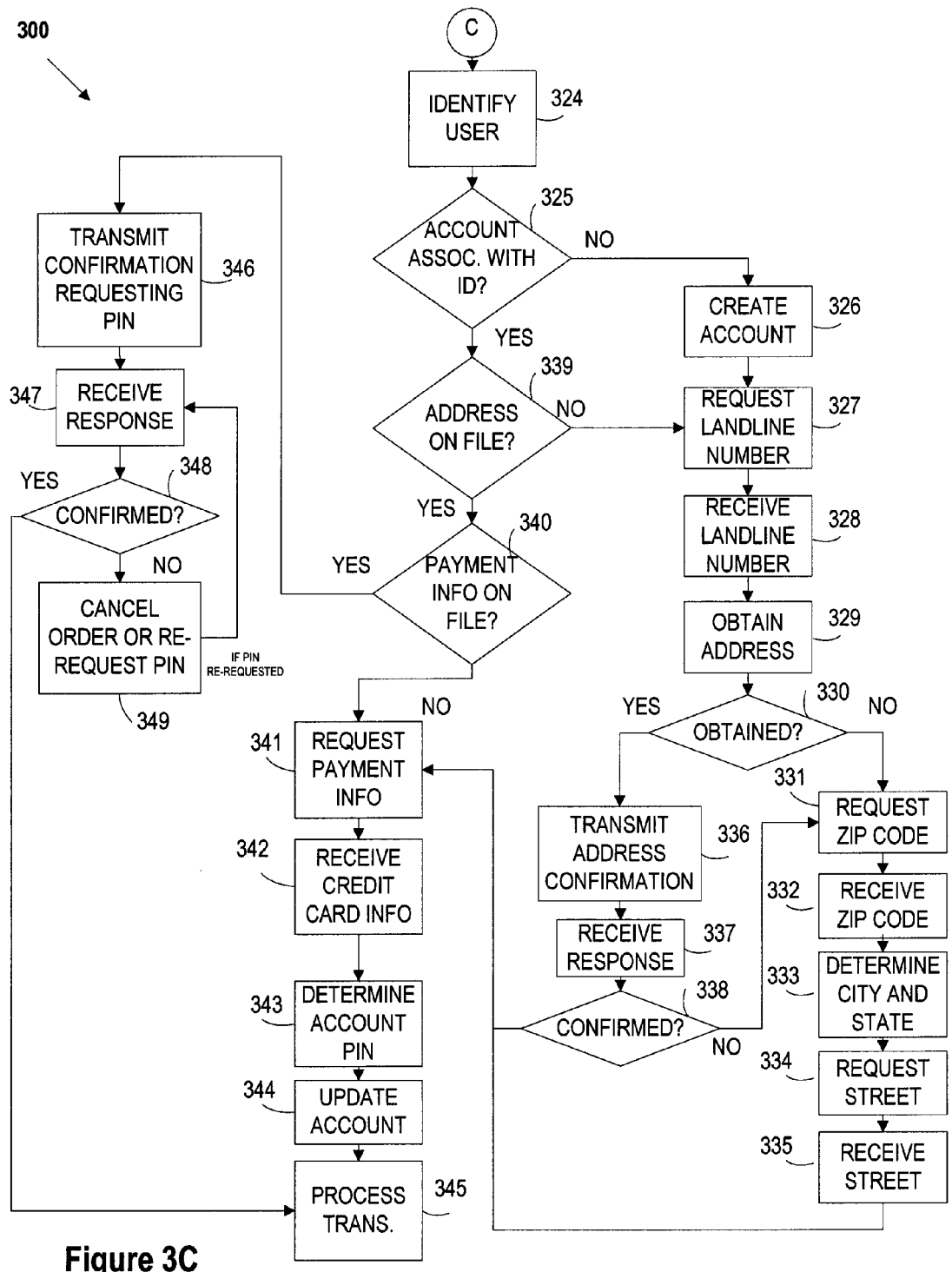
FIG. 3C depicts an exemplary method of consumer registration according to an embodiment of the disclosure.

FIGS. 3A, 3B, and 3C depict a flow chart 300 illustrating an exemplary method for consumer registration according to an embodiment of the disclosure. In various exemplary embodiments, a user (e.g., a consumer) may register via a mobile device to engage in a promotion or purchase consumer products.

In block 301, a request may be received. For example, an integrated mobile application server may receive a request from a requesting device. This request may be associated with an identification number that may be associated with the requesting device. For example, the request may be associated with a mobile number of a mobile phone or like device. In various exemplary embodiments, the request may be transmitted from a requesting device to the integrated mobile application server in the form of a text message, SMS message, EMS message, MMS message, electronic mail, instant message, wireless web upload, WAP mini site link. The request received may also include a unique identifier or code that is associated with a consumer product. For example, the request may include a unique identifier "BIC" which is associated with a Blue Bic® ballpoint pen. To transmit the request to be received by the integrated mobile application server, a user of a requesting device (e.g., a mobile phone) may transmit a text message to a CSC associated with the integrated mobile application server.

In block 302, a determination may be made as to whether the received request is related to a promotion or a purchase. An integrated mobile application server may store information associating the unique identifier or code with the an indication as to whether the unique identifier is associated with a promotion or a purchase. For example, the integrated mobile application server may store information associating the unique identifier "BIC" with a consumer product promotion. Also, the integrated mobile application server may store information associating the unique identifier "BIC" with a consumer product being purchased. To make this determination, an integrated mobile application server may query a database using the unique identifier as a key into the database. Upon a determination that the request is for a promotion, flow chart 300 may proceed to block 303. Upon making a determination that the request is for a purchase, flow chart 300 may proceed to block 324.

In block 303, a user may be identified. For example, upon receiving a request for a promotion, in block 303, an integrated mobile application server may identify the user by determining the user's identification number, and if applicable, an associated carrier service. For example, where a request is in the form of a text message transmitted by the user from a mobile phone (e.g., (123) 456-7890), an integrated mobile application server may identify the user by determining the user's mobile phone number and, if applicable, the user's mobile phone carrier service (e.g., T-Mobile).

In block 304, a determination may be made as to whether the user has an account associated with the identification number. As described above, an integrated mobile application server may store user accounts that may be identified by an identification number. Upon identifying the user in block 303, an identification number may be determined. This identification number may be used to query a user account database associated with an integrated mobile application server to determine whether the user has an account. For example, where a user's associated identification number is (123) 456-7890, an integrated mobile application server may query an associated user account database using a key such as 1234567890 to determine whether the user has an associated account. Upon a determination that the user has an associated user account, flow chart 300 may proceed to block 315. Upon a determination that the does not have an associated user account, flow chart may proceed to block 305.

In block 305, a user account may be created. In various exemplary embodiments, an integrated mobile application server may create account in an associated user account database. This account may be identified by an identification number associated with the user and/or requesting device. For example, the account may be identified by the mobile phone associated with the user and/or requesting device (e.g., (123) 456-7890 or 1234567890) The user account may store associated user account information as will be described in greater detail below with respect to FIG. 6.

In block 306, a land line number may be requested. A land line number may be used to obtain physical address information associated with the user and/or a gift recipient. To request a land line, an integrated mobile application server may communicate with the requesting device to prompt the user to transmit a land line number to the integrated mobile application server. In an exemplary embodiment, the integrated mobile application server may transmit a message (e.g., a text message) to the requesting device and/or a device associated with the identification number prompting the user to reply with a land line number. Also, an integrated mobile application server may interact with an IVR system to communicate with the requesting device and/or a device associated with the identification number to prompt the user to input a land line number into the IVR.

In block 307, a land line number may be received. An integrated mobile application server may receive the land line number from a requesting device and/or device associated with the identification number. In an exemplary embodiment, the land line number may be received in a text message transmitted to a CSC associated with the integrated mobile application server. For example, a mobile phone associated with the identification number may transmit a text message including "1112223333" in the body of the message as a land line number. Also, by interacting with an IVR, a user may input (e.g., speak and/or enter via a keypad associated with the requesting device) the land line number "1112223333" into the IVR. The land line number may be transmitted to the integrated mobile application server.

In block 308, a physical address associated with the received land line number may be obtained. To obtain the physical address, using the land line number, an integrated mobile application server may access a land line public database and query the land line public database for a physical address associated with the land line number. In various exemplary embodiments, the integrated mobile application server may communicate with the land line public database via a network. Also, the land line database may be integral with the integrated mobile application server.

In block 309, a determination may be made as to whether a physical address was obtained from the land line public database. For example, if the land line public database is queried and a physical address is associated with the land line number, a determination may be made that the physical address was obtained. If the land line public database is queried and a physical address is not associated with the land line number or there is not an entry in the land line public database associated with the land line number, a determination may be made that a physical address was not obtained. Upon a determination that a physical address was obtained, flow chart 300 may proceed to block 310. Upon a determination that a physical address was not obtained, flow chart may proceed to block 319.

In block 310, an address confirmation may be transmitted. To confirm an address, an integrated mobile application server may communicate with the requesting device to confirm that the physical address obtained from the land line public database is correct and/or accurate. In an exemplary embodiment, the integrated mobile application server may transmit a message (e.g., a text message) to the requesting device and/or a device associated with the identification number prompting the user to reply with a confirmation indicating that the physical address is correct and/or accurate. For example, the integrated mobile application server may transmit a text message to the requesting device prompting the user to reply "1" if the physical address is "123 Any Street, Anytown, AnyState 22222" or reply "2" if the address is not s "123 Any Street, Anytown, AnyState 22222." Also, an integrated mobile application server may interact with an IVR system to communicate with the requesting device and/or a device associated with the identification number to communicate the address "123 Any Street, Anytown, AnyState 22222" to the requesting device and prompt the user to reply "Yes" or "No" into the IVR (by speaking a response or inputting a "1" for "Yes" or "2" for "No" into a keypad associated with the requesting device).

In block 311, an address confirmation may be received. An integrated mobile application server may receive the text message and/or IVR confirmation response from the requesting device.

In block 312, a determination may be made as to whether the physical address has been confirmed. For example, if the user replies to a text message with "1" to confirm or inputs "Yes" or "1" into an IVR, the physical address may be confirmed. If, for example, the user replies to a text message with a "2" to confirm or inputs "No" or "2" into an IVR, the physical address may not be confirmed. Upon a confirmation of the physical address, flow chart 300 may proceed to block 313. Upon a failed confirmation of the physical address, flow chart 300 may proceed to block 319.

In block 313, an account may be updated. An integrated mobile application server may update an account identified by an identification number associated with a requesting device to include the physical address. For example, account 1234567890 may be updated to include a physical address "123 Any Street, Anytown, AnyState 22222."

In block 314, the physical address may be transmitted to a fulfillment system. In various exemplary embodiments, an integrated mobile application server may communicate with a fulfillment system via a network to transmit the address to a fulfillment system. Also, consumer product information (e.g., one Blue Bic® ballpoint pen) may be transmitted to the fulfillment system so that the fulfillment system may ship one Blue Bic® ballpoint pen to "123 Any Street, Anytown, AnyState 22222."

In block 319, a zip code associated with a physical may be requested. To request a zip code, an integrated mobile application server may communicate with the requesting device to prompt the user to transmit a zip code to the integrated mobile application server. In an exemplary embodiment, the integrated mobile application server may transmit a message (e.g., a text message) to the requesting device and/or a device associated with the identification number prompting the user to reply with a zip code. Also, an integrated mobile application server may interact with an IVR system to communicate with the requesting device and/or a device associated with the identification number to prompt the user to input a zip code into the IVR.

In block 320, a zip code may be received. An integrated mobile application server may receive the zip code from a requesting device and/or device associated with the identification number. In an exemplary embodiment, the zip code may be received in a text message transmitted to a CSC associated with the integrated mobile application server. For example, a mobile phone associated with the identification number may transmit a text message including "22222" in the body of the message as a zip code. Also, by interacting with an IVR, a user may input (e.g., speak and/or enter via a keypad associated with the requesting device) the zip code "22222" into the IVR. The zip code may be transmitted to the integrated mobile application server.

In block 321, a city and state associated with a zip code may be determined. In an exemplary embodiment, a zip code database may store information associating zip codes with respective city and state information. For example, a zip code database may store information associating zip code "22222" with the city "Anytown" and state "AnyState." Using the zip code as a key, a zip code database may be queried for the associated city and state information. This associated city and state information may be returned to the integrated mobile application server.

In block 322, a street address associated with a physical may be requested. To request a street address, an integrated mobile application server may communicate with the requesting device to prompt the user to transmit a street address to the integrated mobile application server. In an exemplary embodiment, the integrated mobile application server may transmit a message (e.g., a text message) to the requesting device and/or a device associated with the identification number prompting the user to reply with a street address. For example, the integrated mobile application server may transmit a text message to a requesting device prompting a user to reply with a street address located in "Anytown, AnyState." Also, an integrated mobile application server may interact with an IVR system to communicate with the requesting device and/or a device associated with the identification number to prompt the user to input a street address located in "Anytown, AnyState" into the IVR.

In block 323, a street address may be received. An integrated mobile application server may receive the street address from a requesting device and/or device associated with the identification number. In an exemplary embodiment, the street address may be received in a text message transmitted to a CSC associated with the integrated mobile application server. For example, a mobile phone associated with the identification number may transmit a text message including "123 Any Street" in the body of the message as a street address. Also, by interacting with an IVR, a user may input (e.g., speak and/or enter via a keypad associated with the requesting device) the street address "123 Any Street" into the IVR. The zip code may be transmitted to the integrated mobile application server. Other information including, without limitation, the user's name, email address, and/or any other account information to create a user account may be requested and received in a similar manner as described. Upon receipt of a street address, a user account may be updated in a similar manner as described above for block 313. Once the user account is updated, the physical address may be transmitted to a fulfillment system in a similar manner as described above for block 314.

In block 315, an address confirmation may be transmitted in a similar manner as described above for block 310.

In block 316, an address confirmation may be received in a similar manner as described above for block 311.

In block 317, a determination may be made as to whether the physical address has been confirmed in a similar manner as described above for block 312. Upon a determination that a physical address has not been confirmed, flow chart 300 may proceed to block 306. Upon a determination that a physical address has been confirmed, flow chart 300 may proceed to block 318.

In block 318, a physical address may be transmitted to a fulfillment system in a similar manner as described above for block 314.

As noted above, upon a determination that a request is associated with a purchase of a consumer product, flow chart 300 may proceed to block 324. As illustrated in FIG. 3C, in block 324, a user may be identified in a similar manner as described above for block 303.

In block 325, a determination may be made as to whether the user has an associated user account associated in a similar manner as described above for block 304. Upon a determination that the user has an associated user account, flow chart 300 may proceed to block 339. Upon a determination that a user does not have an associated user account, flow chart 300 may proceed to block 326.

In block 326, a user account may be created in a similar manner as described above for block 305.

In block 327, a land line number may be requested in a similar manner as described above for block 306.

In block 328, a land line number may be received in a similar manner as described above for block 307.

In block 329, a physical address associated with the received land line number may be obtained in a similar manner as described above for block 308.

In block 330, a determination may be made as to whether a physical address was obtained in a similar manner as described above for block 309. Upon making a determination that a physical address was obtained, flow chart 300 may proceed to block 336. Upon making a determination that a physical address was not obtained, flow chart 300 may proceed to block 331.

In block 331, a zip code may be requested in a similar manner as described above for block 319.

In block 332, a zip code may be received in a similar manner as described above for block 320.

In block 333, a city and state associated with the zip code may be determined in a similar manner as described above for block 321.

In block 334, a street address associated with the city and state may be requested in a similar manner as described above for block 322.

In block 335, a street address may be received in a similar manner as described above for block 323.

As noted above, upon a determination in block 330 that a physical address was obtained, flow chart may proceed to block 336. In block 336, an address confirmation may be transmitted in a similar manner as described above for block 310.

In block 337, an address confirmation may be received in a similar manner as described above for block 311.

In block 338, a determination may be made as to whether a physical address has been confirmed in a similar manner as described above for block 312. Upon a determination that a physical address has not been confirmed, flow chart 300 may proceed to block 331. Upon a determination that a physical address has been confirmed, flow chart 300 may proceed to block 341.

As noted above, upon a determination in block 325 that a user has an associated user account, flow chart 300 may proceed to block 339. In block 339, a determination may be made as to whether a physical address is associated with the user account. In various exemplary embodiments, a user account may be identified by an identification number. To determine whether a physical address is associated with a user account, a user account database may be queried using the identification number. If a user account has an associated physical address, the physical address may be returned in response to the query. If a user account does not have an associated physical address, a null response may be returned in response to the query, for example. Upon a determination that physical address is not associated with the user account, flow chart 300 may proceed to block 327. Upon a determination that a user account has an associated physical address, flow chart 300 may proceed to block 340.

In block 340, a determination may be made as to whether payment information is associated with the user account. To determine whether payment information is associated with a user account, a user account database may be queried using the identification number. If a user account has associated payment information, the payment information may be returned in response to the query. If a user account does not have associated payment information, a null response may be returned in response to the query, for example. Upon a determination that payment information is not associated with the user account, flow chart 300 may proceed to block 341. Upon a determination that a user account has associated payment information, flow chart 300 may proceed to block 346.

In block 341, payment information may be requested. To request payment information, an integrated mobile application server may communicate with the requesting device to prompt the user to transmit payment information to the integrated mobile application server. In an exemplary embodiment, the integrated mobile application server may transmit a message (e.g., a text message) to the requesting device and/or a device associated with the identification number prompting the user to reply with payment information. Also, an integrated mobile application server may interact with an IVR system to communicate with the requesting device and/or a device associated with the identification number to prompt the user to input payment information number into the IVR.

In block 342, payment information may be received. An integrated mobile application server may receive the payment information from a requesting device and/or device associated with the identification number. In an exemplary embodiment, the payment information may be received in a text message transmitted to a CSC associated with the integrated mobile application server. For example, a mobile phone associated with the identification number may transmit a text message including "111122223333444 exp1010" in the body of the message as payment information. In various exemplary embodiments, this payment information may be securely transmitted using, for example, any number of various encryption techniques. Also, by interacting with an IVR, a user may input (e.g., speak and/or enter via a keypad associated with the requesting device) the payment information (e.g., account number and/or associated expiration date) into the IVR. The payment information may be transmitted to the integrated mobile application server.

In block 343, a personal identification number (PIN) associated with a user account may be determined. In an exemplary embodiment, an integrated mobile application server may randomly determine a PIN to be associated with the user account. In such an embodiment, the integrated mobile application server may communicate the PIN via a text message and/or IVR system. Also, to determine a PIN, user may select the PIN and communicate the PIN to the integrated mobile application server. This PIN may be associated with the user account and stored within the integrated mobile application server.

In block 344, a user account may be updated in a similar manner as described above for block 313.

In block 345, a transaction may be processed. As noted above, a request may include a unique identifier "BIC" that is associated with a Blue Bic® ballpoint pen. To process the transaction, an integrated mobile application server may interact with a fulfillment system to transmit the request for a Blue Bic® ballpoint pen to be shipped to a physical address associated with the user account. Integrated mobile application server may also interact with a payment interface to process payment of the transaction in accordance with the associated payment information.

As noted above, upon a determination that a user has an associated user account, a physical address is associated with the user account, and payment information is associated with the user account, flow chart 300 may proceed to block 346. In block 346, a PIN confirmation may be transmitted. To confirm a PIN, an integrated mobile application server may communicate with the requesting device to request the PIN. In an exemplary embodiment, the integrated mobile application server may transmit a message (e.g., a text message) to the requesting device and/or a device associated with the identification number prompting the user to reply with the PIN. For example, the integrated mobile application server may transmit a text message to the requesting device prompting the user to reply with the user's PIN if the user desires to purchase "one Blue Bic® ballpoint pen to be shipped to 123 Any Street, Anytown, AnyState 22222." Also, an integrated mobile application server may interact with an IVR system to communicate with the requesting device and/or a device associated with the identification number to communicate the PIN via the IVR (by speaking a response or inputting the PIN into a keypad associated with the requesting device).

In block 347, a PIN confirmation may be received. An integrated mobile application server may receive the text message and/or IVR confirmation response from the requesting device.

In block 348, a determination may be made as to whether the PIN has been confirmed. For example, if the user replies to a text message with the correct PIN or inputs the correct PIN into the IVR, the PIN may be confirmed. If, for example, the user replies to a text message with an incorrect PIN or inputs an incorrect PIN into an IVR, the PIN may not be confirmed. Upon a confirmation of the PIN, flow chart 300 may proceed to block 345. Upon a failed confirmation of the PIN, flow chart 300 the transaction may be cancelled in block 349 or the PIN may be re-requested and flow chart 300 may proceed to block 347 to receive the PIN and subsequently confirm the PIN.

Figure 4A:
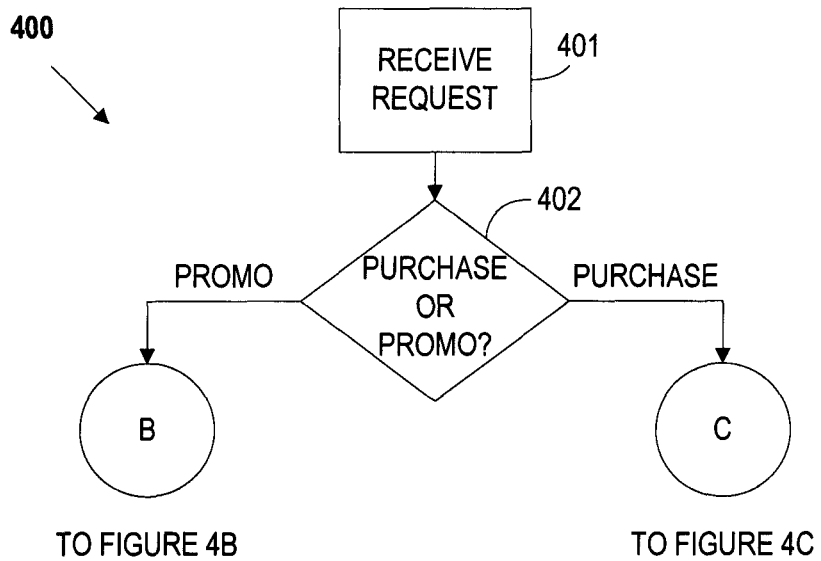
FIG. 4A depicts an exemplary method of consumer registration according to an embodiment of the disclosure.
Figure 4B:
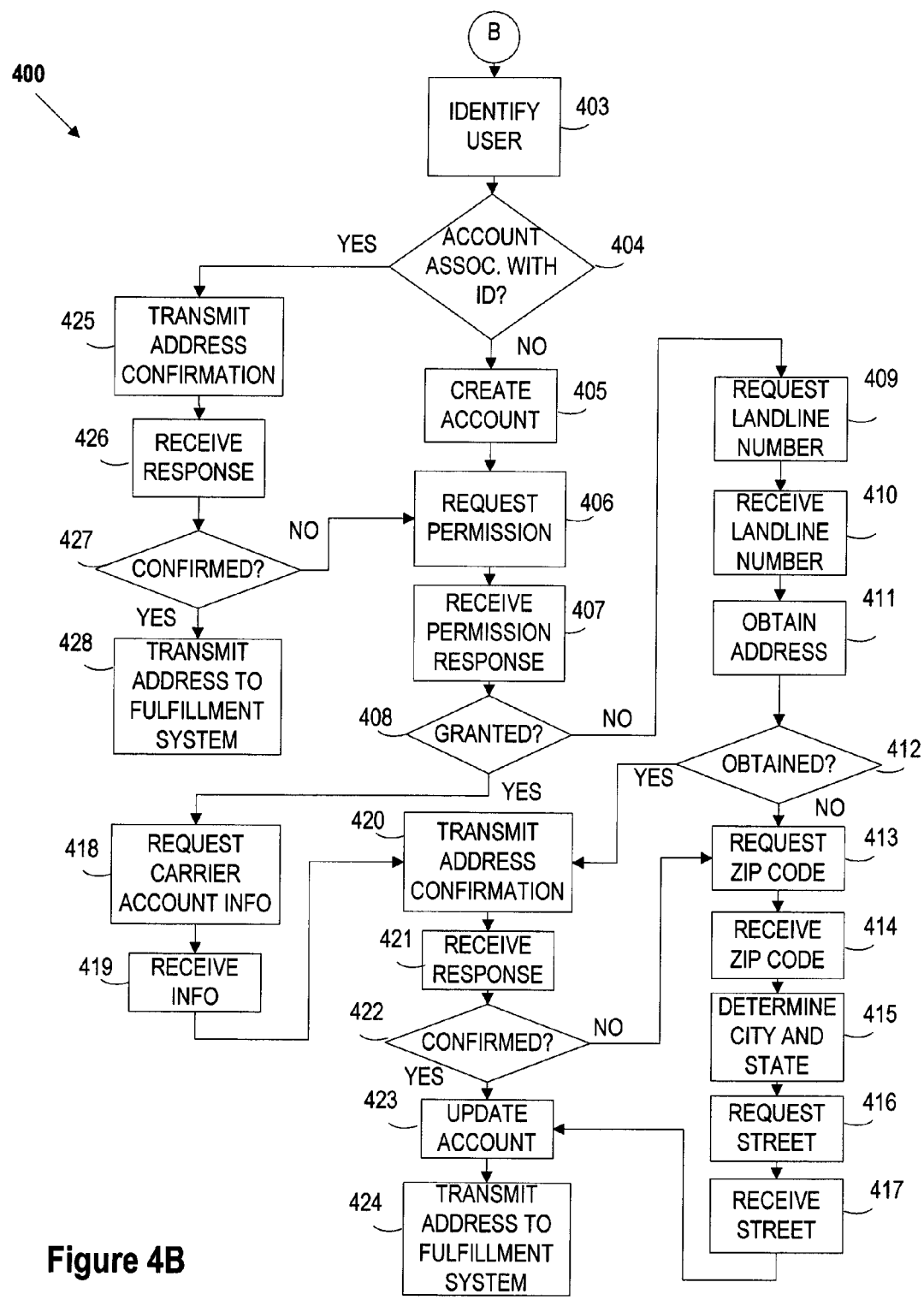
FIG. 4B depicts an exemplary method of consumer registration according to an embodiment of the disclosure.
Figure 4C:
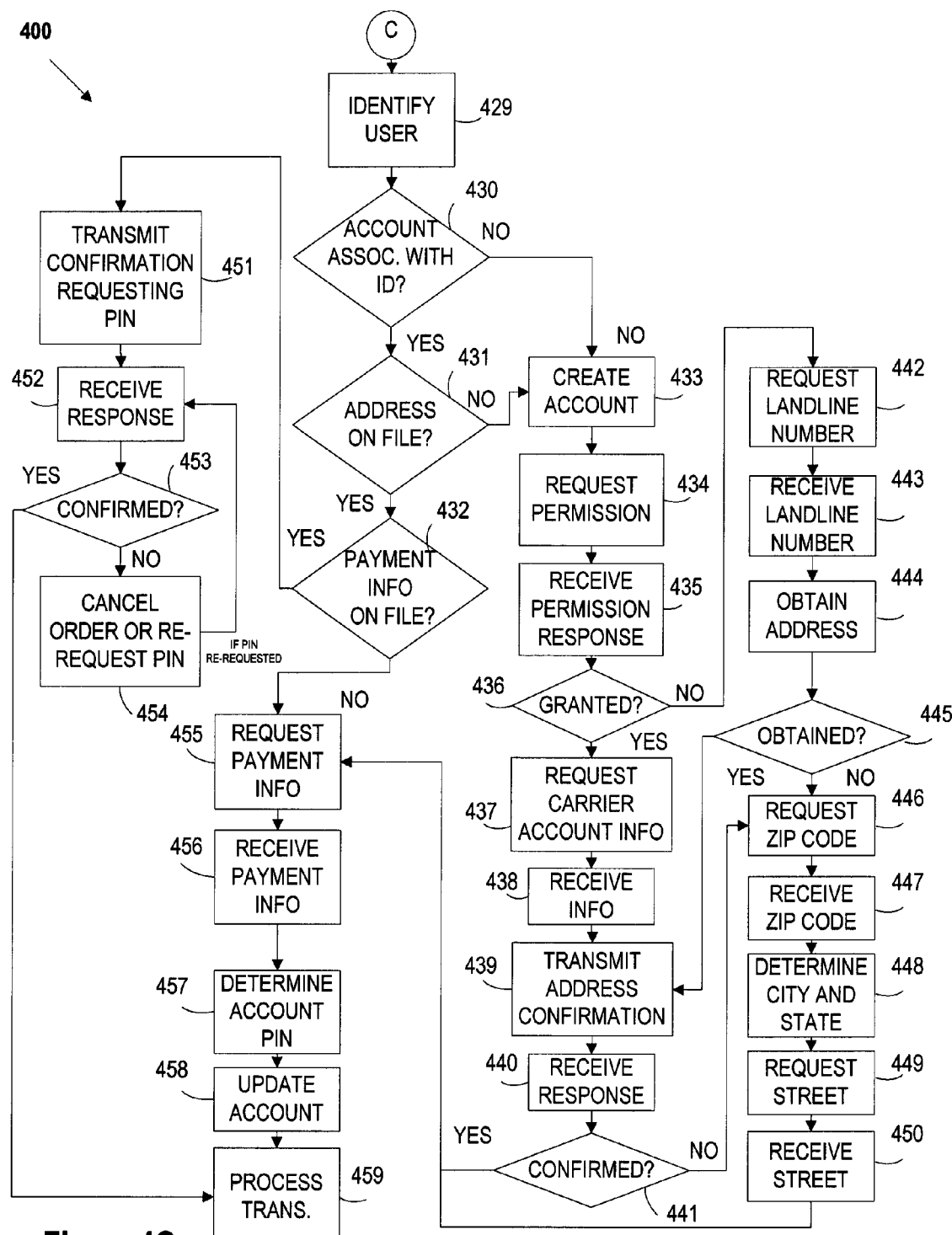
FIG. 4C depicts an exemplary method of consumer registration according to an embodiment of the disclosure.

FIGS. 4A, 4B, and 4C depict a flow chart 400 illustrating an exemplary method for consumer registration according to an embodiment of the disclosure. In various exemplary embodiments, a user (e.g., a consumer) may register via a mobile device to engage in a promotion or purchase consumer products.

In block 401, a request may be received in a similar manner as described above for block 301.

In block 402, a determination may be made as to whether the received request is related to a promotion or a purchase in a similar manner as described above for block 302. Upon a determination that the request is for a promotion, flow chart 400 may proceed to block 403. Upon making a determination that the request is for a purchase, flow chart 300 may proceed to block 429.

In block 403, a user may be identified in a similar manner as described above for block 303.

In block 404, a determination may be made as to whether the user has an associated user account associated in a similar manner as described above for block 304. Upon a determination that the user has an associated user account, flow chart 400 may proceed to block 425. Upon making a determination that a user does not have an associated user account, flow chart 400 may proceed to block 405.

In block 405, a user account may be created in a similar manner as described above for block 305.

In block 406, permission to access a user's carrier account may be requested. As noted above, in various embodiments, a land line number may be used to obtain a physical address associated with the user. Carrier account information may also be used to obtain a physical address of the user. In these embodiments, an integrated mobile application server may need permission from the user to access the user's carrier account information. As noted above, a carrier may refer to a mobile phone carrier service. Carrier account information may be associated with a carrier system. With permission from the user, an integrated mobile application server may access carrier account information via a network. To request permission, an integrated mobile application server may determine the user's carrier service (see block 303) and communicate with the requesting device to request permission to access the user's carrier account information and prompt the user to transmit a permission response to the integrated mobile application server. In an exemplary embodiment, the integrated mobile application server may transmit a message (e.g., a text message) to the requesting device and/or a device associated with the identification number requesting access to the user's "T-Mobile" account, for example, and prompting the user to reply "1" if permission is granted or "2" if permission is not granted. Also, an integrated mobile application server may interact with an IVR system to communicate with the requesting device and/or a device associated with the identification number to prompt the user to input a permission response into the IVR.

In block 407, a permission response may be received. An integrated mobile application server may receive the permission response from a requesting device and/or device associated with the identification number. In an exemplary embodiment, the permission response may be received in a text message transmitted to a CSC associated with the integrated mobile application server. For example, a mobile phone associated with the identification number may transmit a text message including "1" in the body of the message as a permission response. Also, by interacting with an IVR, a user may input (e.g., speak and/or enter via a keypad associated with the requesting device) the permission response "Yes" or "1" into the IVR. The permission response may be transmitted to the integrated mobile application server.

In block 408, a determination may be made as to whether permission to access the user's carrier account information has been granted. For example, if the user replies to a text message with "1" to confirm or inputs "Yes" or "1" into an IVR, permission may be granted. If, for example, the user replies to a text message with a "2" to confirm or inputs "No" or "2" into an IVR, permission may not be granted. Upon a granting of permission, flow chart 400 may proceed to block 418. Upon permission not being granted, flow chart 400 may proceed to block 409.

In block 409, a land line number may be requested in a similar manner as described above for block 306.

In block 410, a land line number may be received in a similar manner as described above for block 307.

In block 411, a physical address associated with the received land line number may be obtained in a similar manner as described above for block 308.

In block 412, a determination may be made as to whether a physical address was obtained in a similar manner as described above for block 309. Upon a determination that a physical address was obtained, flow chart 400 may proceed to block 420. Upon a determination that a physical address was not obtained, flow chart 400 may proceed to block 413.

In block 413, a zip code may be requested in a similar manner as described above for block 319.

In block 414, a zip code may be received in a similar manner as described above for block 320.

In block 415, a city and state associated with the zip code may be determined in a similar manner as described above for block 321.

In block 416, a street address associated with the city and state may be requested in a similar manner as described above for block 322.

In block 417, a street address may be received in a similar manner as described above for block 323.

As noted above, upon a granting of permission to access carrier account information, in block 418, carrier account information may be requested. To request carrier information, an integrated mobile application server may communicate with a carrier system via a network to query the carrier system and/or a database associated with the carrier system using the identification number. For example, an integrated mobile application server system may query carrier a database associated with carrier server system to return a physical address associated with mobile number "(123) 456-7890).

In block 419, the physical address associated with the identification number may be received by an integrated mobile application system.

In block 420, an address confirmation may be transmitted in a similar manner as described above for block 310.

In block 421, an address confirmation may be received in a similar manner as described above for block 311.

In block 422 a determination may be made as to whether the physical address has been confirmed in a similar manner as described above for block 312. Upon a determination that a physical address has not been confirmed, flow chart 400 may proceed to block 413. Upon a determination that a physical address has been confirmed, flow chart 400 may proceed to block 423.

In block 423, a user account may be updated in a similar manner as described above for block 313.

In block 424, a physical address may be transmitted to a fulfillment system in a similar manner as described above for block 314.

As noted above, upon a determination that a user account is associated with an identification number, flow chart 400 may proceed to block 425. In block 425 an address confirmation may be transmitted in a similar manner as described above for block 310.

In block 426, an address confirmation may be received in a similar manner as described above for block 311.

In block 427 a determination may be made as to whether the physical address has been confirmed in a similar manner as described above for block 312. Upon a determination that a physical address has not been confirmed, flow chart 400 may proceed to block 406. Upon a determination that a physical address has been confirmed, flow chart 400 may proceed to block 428.

In block 428, a physical address may be transmitted to a fulfillment system in a similar manner as described above for block 314.

As noted above, upon a determination that a request is associated with a purchase of a consumer product, flow chart 400 may proceed to block 429. As illustrated in FIG. 4C, in block 429, a user may be identified in a similar manner as described above for block 303.

In block 430, a determination may be made as to whether the user has an associated user account associated in a similar manner as described above for block 304. Upon a determination that the user has an associated user account, flow chart 400 may proceed to block 431. Upon making a determination that a user does not have an associated user account, flow chart 400 may proceed to block 433.

In block 433, a user account may be created in a similar manner as described above for block 305.

In block 434, permission to access a user's carrier account may be requested in a similar manner as described above for block 406.

In block 435, a permission response may be received in a similar manner as described above for block 407.

In block 436, a determination may be made as to whether permission to access carrier account information has been granted in a similar manner as described above for block 408. Upon a determination that permission is granted, flow chart 400 may proceed to block 437. Upon a determination that permission is not granted, flow chart 400 may proceed to block 442.

In block 442, a land line number may be requested in a similar manner as described above for block 306.

In block 443, a land line number may be received in a similar manner as described above for block 307.

In block 444, a physical address associated with the received land line number may be obtained in a similar manner as described above for block 308.

In block 445, a determination may be made as to whether a physical address was obtained in a similar manner as described above for block 309. Upon making a determination that a physical address was obtained, flow chart 400 may proceed to block 439. Upon making a determination that a physical address was not obtained, flow chart 400 may proceed to block 446.

In block 446, a zip code may be requested in a similar manner as described above for block 319.

In block 447, a zip code may be received in a similar manner as described above for block 320.

In block 448, a city and state associated with the zip code may be determined in a similar manner as described above for block 321.

In block 449, a street address associated with the city and state may be requested in a similar manner as described above for block 322.

In block 450, a street address may be received in a similar manner as described above for block 323.

As noted above, upon a granting of permission to access carrier account information, in block 437, carrier account information may be requested in a similar manner as described above for block 418.

In block 438, the carrier account information may be received in a similar manner as described above for block 419.

In block 439, an address confirmation may be transmitted in a similar manner as described above for block 310.

In block 440, an address confirmation may be received in a similar manner as described above for block 311.

In block 441*a* determination may be made as to whether the physical address has been confirmed in a similar manner as described above for block 312. Upon a determination that a physical address has not been confirmed, flow chart 400 may proceed to block 446. Upon a determination that a physical address has been confirmed, flow chart 400 may proceed to block 455.

In block 455, payment information may be requested in a similar manner as described above for block 341.

In block 456, payment information may be received in a similar manner as described above for block 342.

In block 457, a PIN may be determined in a similar manner as described above for block 343.

In block 458, an account may be updated in a similar manner as described above for block 313.

In block 459, a transaction may be processed in a similar manner as described above for block 345.

As noted above, upon making a determination that a user has an account associated with an identification number, in block 431, a determination may be made as to whether an address is associated with the account in a similar manner as described above for block 339. Upon a determination that a user account is not associated with an address, flow chart 400 may proceed to block 433. Upon a determination that an address is associated with the user account, flow chart 400 may proceed to block 432.

In block 432, a determination may be made as to whether payment information is associated with the user account in a similar manner as described above for block 340. Upon a determination that payment information is not associated with the user account, flow chart 400 may proceed to block 455. Upon a determination that payment information is associated with the user account, flow chart 400 may proceed to block 451. In block 451, a PIN confirmation may be transmitted in a similar manner as described above for block 346.

In block 452, a PIN response may be received in a similar manner as described above for block 347.

In block 453, a determination may be made as to whether the PIN is confirmed in a similar manner as described above for block 348. Upon a determination that the PIN has been confirmed, flow chart 400 may proceed to block 459. Upon a determination that the PIN has not been confirmed, flow chart 400 may proceed to block 454 to cancel the transaction or re-request the PIN. If the PIN is re-requested, flow chart 400 may proceed to block 452 to receive a PIN confirmation.

Figure 5:
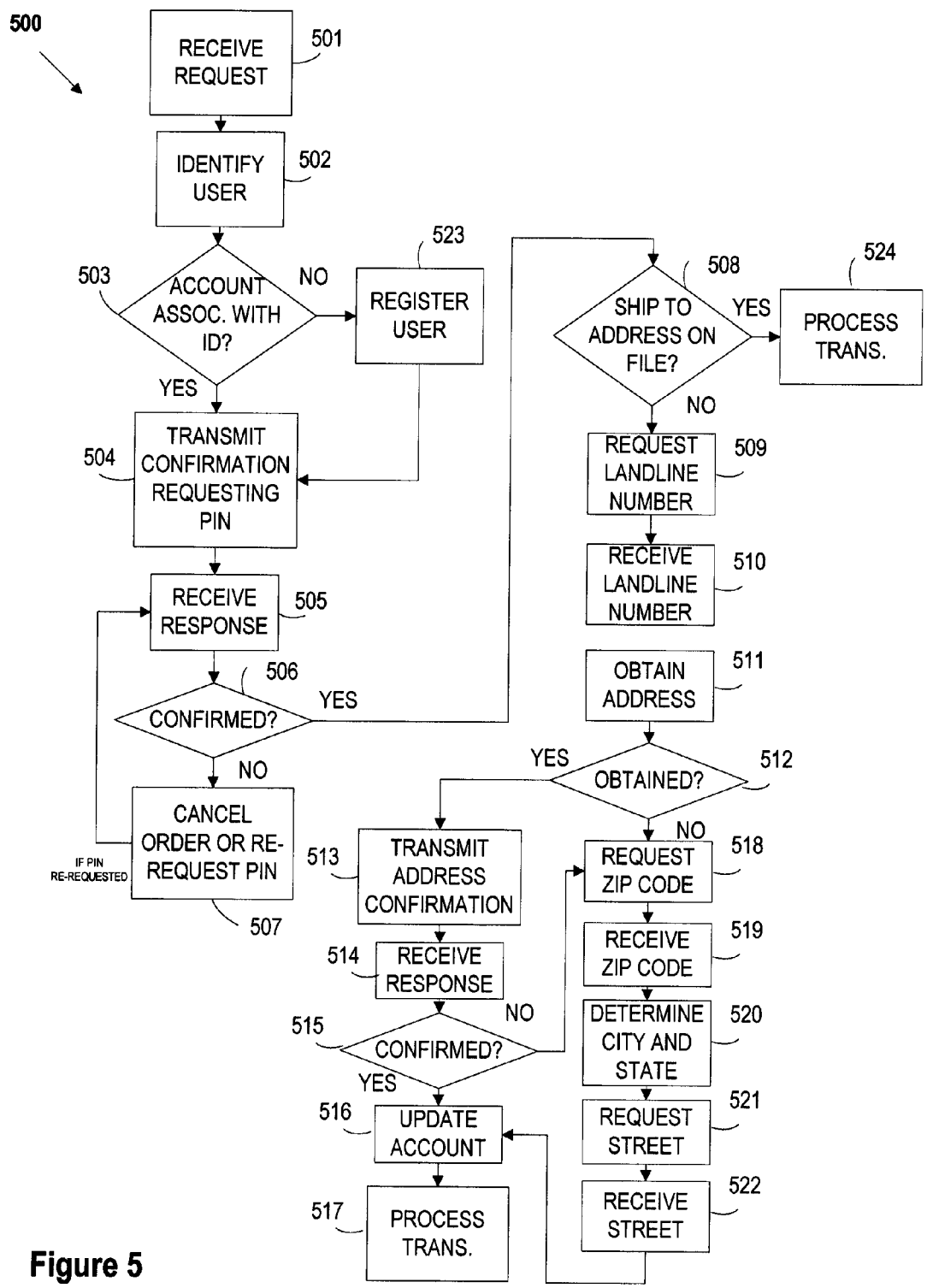
FIG. 5 depicts an exemplary method of obtaining an address of an intended recipient according to an embodiment of the disclosure.

FIG. 5 depicts a flow chart 500 which illustrates an exemplary method for registering consumer shipping addresses via a mobile device, for example. In various exemplary embodiments, a user may have a user account and associated account information. A user may wish to purchase a consumer product using methods described above, and may intend that the recipient of the consumer product be a gift recipient and/or that the consumer product be shipped to an address other than the address associated with the user's account. For example, a user may wish to purchase a Blue Bic® ballpoint pen to be given to the user's mother. Also, the user may wish to purchase the Blue Bic® ballpoint pen to be shipped to the user's office address instead of the home address associated with the user account.

In block 501, a request may be received in a similar manner as described above for block 301.

In block 502, the user may be identified in a similar manner as described above for block 302.

In block 503, a determination may be made as to whether a user account is associated with an identification number in a similar manner as described above for block 304. Upon a determination that a user account is associated with an identification number, flow chart 500 may proceed to block 504. Upon a determination that a user account is not associated with an identification number, in block 523, the user may be registered in a similar manner as described above.

In block 504, a PIN confirmation may be transmitted in a similar manner as described above for block 346.

In block 505, a PIN response may be received in a similar manner as described above for block 347.

In block 506, a determination may be made as to whether the PIN is confirmed in a similar manner as described above for block 348. Upon a determination that the PIN has been confirmed, flow chart 500 may proceed to block 508. Upon a determination that the PIN has not been confirmed, flow chart 500 may proceed to block 507 to cancel the transaction or re-request the PIN. If the PIN is re-requested, flow chart 500 may proceed to block 505 to receive a PIN confirmation.

In block 508, a determination may be made as to whether the ship the consumer product to the physical address on file. In various exemplary embodiments, an integrated mobile application server may communicate with a requesting device and/or a device associated with the identification number to prompt the user regarding where to ship the consumer product. For example, to prompt the user, an integrated mobile application server may communicate with the requesting device to prompt the user to transmit an affirmative indicator if the user desires to ship the consumer product to the address on file (and may also communicate the address to the user) to the integrated mobile application server. In an exemplary embodiment, the integrated mobile application server may transmit a message (e.g., a text message) to the requesting device and/or a device associated with the identification number prompting the user to reply with "1" if the user desired to ship the consumer product to the address on file or a "2" if the user desires to ship the consumer product elsewhere. Also, an integrated mobile application server may interact with an IVR system to communicate with the requesting device and/or a device associated with the identification number to prompt the user to input a response regarding where to ship the consumer product into the IVR.

In block 509, a land line number may be requested in a similar manner as described above for block 306. In various exemplary embodiments, this land line number may be requested to prompt the user input a land line associated with a physical address where the user desires the consumer product to be shipped. This address, once determined, may be associated with the user account and, for example, an identifier of the address so that the user may ship future shipments to this address. For example, a user may desire to ship the consumer product to the user's mother, whose land line number is (222) 333-4444 and the associated address is 456 Other Street, Othertown, OtherState, 11111.

In block 510, a land line number may be received in a similar manner as described above for block 307. For example, an integrated mobile application server may receive a land line number (222) 333-4444.

In block 511, an address associated with the received land line number may be obtained in a similar manner as described for block 308. For example, using (222) 333-4444 as a key, a land line public database may be queried to return an address associated with the land line number.

In block 512, a determination may be made as to whether a physical address was obtained in a similar manner as described above for block 309. Upon making a determination that a physical address was obtained, flow chart 500 may proceed to block 513. Upon making a determination that a physical address was not obtained, flow chart 500 may proceed to block 518.

In block 518, a zip code associated with the address of the intended recipient may be requested in a similar manner as described above for block 319.

In block 519, a zip code may be received in a similar manner as described above for block 320.

In block 520, a city and state associated with the zip code of the address of the intended recipient may be determined in a similar manner as described above for block 321.

In block 521, a street address associated with the city and state of the intended recipient may be requested in a similar manner as described above for block 322.

In block 522, a street address may be received in a similar manner as described above for block 323.

As noted above, upon making a determination that a physical address was obtained, flow chart 500 may proceed to block 513. In block 513, an address confirmation may be transmitted in a similar manner as described above for block 310. The address confirmation may seek confirmation of the address of the intended recipient.

In block 514, an address confirmation may be received in a similar manner as described above for block 311.

In block 515, a determination may be made as to whether the physical address of the intended recipient has been confirmed in a similar manner as described above for block 312. Upon a determination that a physical address has not been confirmed, flow chart 500 may proceed to block 516. Upon a determination that a physical address has been confirmed, flow chart 500 may proceed to block 518.

In block 516, a user account may be updated. For example, the physical address of the intended recipient (e.g., the gift recipient or an alternative shipping address) may be associated with the user account. A identifier may also be associated with the physical address of the intended recipient as will be described in greater detail below with respect to FIG. 6.

In block 517, a physical address of the intended recipient may be transmitted to a fulfillment system in a similar manner as described above for block 314.

FIG. 6 depicts an exemplary screen display 600 of user account information 601. As shown in FIG. 6, a user account may be identified by an account number 602. In various exemplary embodiments, the account number may be associated with a requesting device and/or an identification number associated with a requesting device. For example, an account may be identified by a mobile phone number of a user.

Account information 601 may also include a user's personal information 603, payment information 604, shipping information 605, gift recipient information 606, and/or alternative shipping location information 607. Screen display 600 may also include additional account features 608 that may enable a user to access and/or edit account information, for example.

Personal information 603 may include a user's name and address. For example personal information may include a name, street address, city, state, and zip code.

Payment information 604 may include a billing address of the user, associated payment account information (e.g., credit card account information, debit account information, demand deposit account information, prepaid account information, Internet-based account information and/or other like account information). Although only on account is illustrated, payment account information may be associated with a user account and, during the purchase of a consumer product, for example, a user may select a payment method in a similar manner as described above for identifying a gift recipient or alternative shipping location for the consumer product. For example, an integrated mobile application server prompt a user via a text message or IVR to provide input as to which payment method the user selects.

Shipping information 605 may identify the physical address where consumer products are to be shipped.

Gift recipient information 606 may include the personal information 606a of a gift recipient and an identifier 606b associated with the recipient (e.g., "MOM"). The gift recipient's address may be obtained using the gift recipients land line number and/or zip code as described above.

Alternative shipping information 607 may include the personal information 607a associated with an alternative shipping address of a user, for example, and an identifier associated with the alternative shipping address (e.g., "WORK"). The alternative shipping address information may be obtained using a land line number and/or zip code as described above.

Additional account features 608 may enable the user to view the user's order history, edit user account information, add a gift recipient, and/or alternative shipping location.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of processing a transaction via a mobile communication network, the method being performed by one or more processors and comprising:

receiving a request to process a transaction, the request being directed to a common short code (CSC) and including an unique identifier associated with a consumer product;

in response to receiving the request, determining whether the request corresponds to a purchase of the consumer product or a promotion of the consumer product based on the unique identifier;

determining a user account associated with the request based on a mobile phone number from which the request was sent;

determining an address associated with the request;

when the request corresponds to a purchase of the consumer product:

determining payment information associated with the request based on the determined user account;

initiating payment processing for the transaction based on the determined payment information, and fulfilling the transaction based on the determined address; and when the request corresponds to a promotion of the consumer product, initiating shipment of the promotional product to the determined address.

2. The method of claim 1, wherein the address is determined based on carrier account information for a carrier account associated with a mobile device from which the request to process the transaction was received.

3. The method of claim 1, wherein the address is determined based on a land line number.

4. The method of claim 1, wherein the address is determined from the user account.

5. The method of claim 1, wherein the payment information is determined based on a message sent to the CSC.

6. The method of claim 1, wherein the payment information is determined based on the user account.

7. The method of claim 1, wherein the mobile communication network includes at least one of: a short message service, an enhanced message service, a multimedia message service, an electronic mail service, an instant messaging service, or a web service.

8. A system for processing a transaction via a mobile communication network, the system comprising:
a memory device that stores a set of instructions;
at least one processor that executes the set of instructions to perform the following operations:
receiving a request to process a transaction, the request being directed to a common short code (CSC) and including an unique identifier associated with a consumer product;
in response to receiving the request, determining whether the request corresponds to a purchase of the consumer product or a promotion of the consumer product based on the unique identifier;
determining a user account associated with the request based on a mobile phone number from which the request was sent;
determining an address associated with the request;
when the request corresponds to a purchase of the consumer product:
determining payment information associated with the request based on the determined user account;
initiating payment processing for the transaction based on the determined payment information, and
fulfilling the transaction based at least in part on the determined address; and
when the request corresponds to a promotion of the consumer product, initiating shipment of the promotional product to the determined address.

9. The system of claim 8, wherein the address is determined based on carrier account information for a carrier account associated with a mobile device from which the request to process the transaction was received.

10. The system of claim 8, wherein the address is determined based on a land line number.

11. The system of claim 8, wherein the address is determined from the user account.

12. The system of claim 8, wherein the payment information is determined based on a message sent to the CSC.

13. The system of claim 8, wherein the payment information is determined based on the user account.

14. The system of claim 8, wherein the mobile communication network includes at least one of: a short message service, an enhanced message service, a multimedia message service, an electronic mail service, an instant messaging service, or a web service.

15. A non-transitory computer readable medium that stores instructions executable by at least one processor of one or more computers, the set of instructions causing the one or more computers to perform the following operations:
receiving a request to process a transaction, the request being directed to a common short code (CSC) and including an unique identifier associated with a consumer product;
in response to receiving the request, determining whether the request corresponds to a purchase of the consumer product or a promotion of the consumer product based on the unique identifier;
determining a user account associated with the request based on a mobile phone number from which the request was sent;
determining an address associated with the request;
when the request corresponds to a purchase of the consumer product:
determining payment information associated with the request based on the determined user account;
initiating payment processing for the transaction based on the determined payment information, and
fulfilling the transaction based on the determined address; and
when the request corresponds to a promotion of the consumer product, initiating shipment of the promotional product to the determined address.

16. The non-transitory computer readable medium of claim 15, wherein the address is determined based on carrier account information for a carrier account associated with a mobile device from which the request to process the transaction was received.

17. The non-transitory computer readable medium of claim 15, wherein the address is determined based on a land line number.

18. The non-transitory computer readable medium of claim 15, wherein the address is determined from the user account.

19. The non-transitory computer readable medium of claim 15, wherein the payment information is determined based on a message sent to the CSC.

20. The non-transitory computer readable medium of claim 15, wherein the payment information is determined based on the user account.

21. The non-transitory computer readable medium of claim 15, wherein the mobile communication network includes at least one of: a short message service, an enhanced message service, a multimedia message service, an electronic mail service, an instant messaging service, or a web service.

* * * * *